J. R. TILLMAN.
OILING DEVICE.
APPLICATION FILED JAN. 19, 1918.
1,318,417.
Patented Oct. 14, 1919.
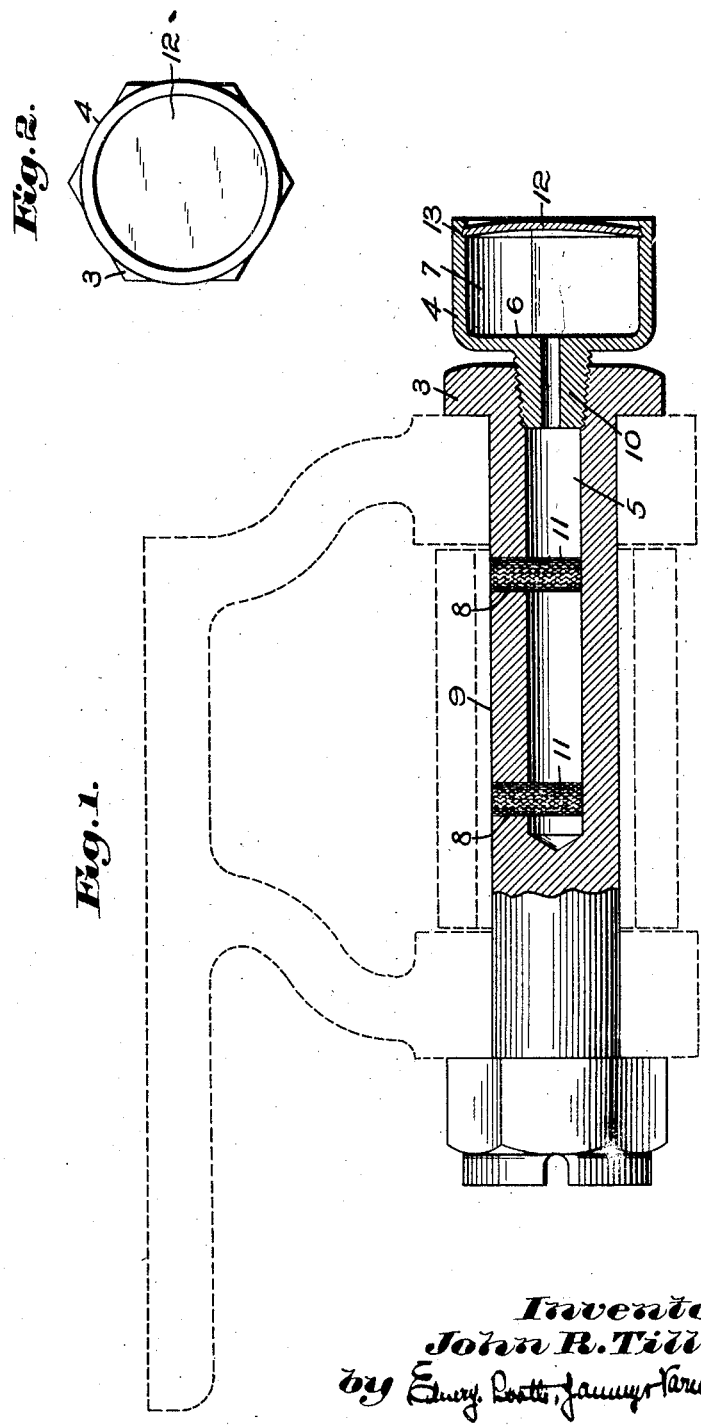
Inventor:
John R. Tillman.
by Emery, Booth, Janney & Varney
Attys.

UNITED STATES PATENT OFFICE.

JOHN R. TILLMAN, OF BRIDGEPORT, CONNECTICUT, ASSIGNOR TO THE LOCOMOBILE COMPANY OF AMERICA, OF BRIDGEPORT, CONNECTICUT, A CORPORATION OF WEST VIRGINIA.

OILING DEVICE.

1,318,417.   Specification of Letters Patent.   Patented Oct. 14, 1919.

Application filed January 19, 1918. Serial No. 212,548.

*To all whom it may concern:*

Be it known that I, JOHN R. TILLMAN, a citizen of the United States, and a resident of Bridgeport, county of Fairfield, and State of Connecticut, have invented an Improvement in Oiling Devices, of which the following description, in connection with the accompanying drawings, is a specification, like characters on the drawings representing like parts.

This invention relates to oiling devices, and is more especially though not exclusively concerned with an oil cup having a single opening for the introduction of the oil into the reservoir, and for the feeding of the oil to the bearing surface which is to be lubricated. While the invention is susceptible of general application, it is particularly useful for the lubrication of spring pins of motor vehicles, more especially such pins as are free to turn about their axes when in use.

My invention will be best understood by reference to the following description, when taken in connection with the accompanying drawings of one specific embodiment thereof, while its scope will be more particularly pointed out in the appended claims.

In the drawings:

Figure 1 is a central, vertical longitudinal section of an oiling device embodying my invention, showing in dotted lines a spring and spring bracket; and Fig. 2 is an elevation of the oil cup alone, as viewed from the right-hand side of Fig. 1.

Referring to the drawings, and to the embodiment of my invention which is illustrated therein, I have shown an oiling device comprising two parts, 3 and 4, one having a passage 5 for conducting the oil toward the surface to be supplied, and the other having a single opening 6 for the introduction of the oil supply into a reservoir 7, and for the feeding of the oil from said reservoir through the opening 6 into the passage 5.

Except for this opening 6, the walls of the oil cup 4 are imperforate. This is especially desirable in the case of spring pins of motor vehicles, especially as it is customary to mount such pins in such a manner that they are free to turn about their axes. In the present example, I have shown the part 3 in the form of a spring pin having two branch passages 8 leading from the main passage 5 to a surface 9 which is to be lubricated. Encircling this spring pin, I have shown in dotted lines a spring and spring bracket illustrating one application of my invention. On one hand, it is desirable to leave the spring pin free to turn so that the wear may be distributed, but on the other hand, this increases the difficulty of lubricating its bearing surface, because with an ordinary oil cup, the oil would be very apt to leak out from the filling opening, since the latter would sometimes be below the level of the oil, as the pin turns around from time to time. With the oil cup herein shown, such leakage is impossible, because the only opening into the oil cup is at all times in communication with the passage to be supplied, when the oil cup is actually in use.

In the present example, the opening 6 is formed in a stem 10 on the body of the oil cup, and this stem is threaded into the end of the spring pin, with the opening 6 preferably concentric with the passage 5. When the cup is to be filled, it is simply unscrewed from its place, filled with oil, and then quickly inserted in the spring bolt and screwed into place. Much of the oil will then flow out through the opening 6 into the passage 5, whence it will be fed to the bearing surface by suitable wicks 11. When the oil level is lowered to a point below the passage 6, still an ample supply of oil will be fed to the passage 5, because of the up and down vibrations to which the device is subjected when the vehicle is passing over inequalities in the roadway.

The outer end of the oil cup may be made permanently sealed by any suitable means, such for example as a cap 12 in the form of a circular plate seated in an internal annular groove 13 formed on the circumferential wall of the oil cup. It should be observed that this plate is concavo-convex in cross-section, with the convex side turned out. By placing the edge of this plate against its seat in the groove 13, and then applying sufficient force at the central portion of the plate in an inward direction, the plate is at least partially flattened and its edge forced firmly into the annular groove, thus permanently uniting the parts and sealing the cup, so that there is no opportunity for the escape of oil, except through the opening 6.

An oil cup constructed in this manner will operate satisfactorily in any position, and can be turned around without danger of any leakage. A further marked advantage is that it is entirely dust-proof, since there is no exposed opening in which dust, dirt or other foreign matter could lodge and enter the oil chamber when the latter is being filled. With the single filling and feeding opening as described, the latter is always clean and in readiness for the introduction of the oil, without danger of grit being carried into the bearing.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. In an oiling device, the combination of means forming a passage for conducting the oil toward the bearing surface to be supplied, and means forming a separable horizontally disposed oil reservoir having a single lateral opening only for the introduction of the oil supply into said reservoir and for the feeding of the oil laterally therethrough into said passage.

2. In an oiling device, the combination of means forming a passage for conducting the oil toward the bearing surface to be supplied, and an oil cup separable laterally therefrom and having in one of its walls a lateral opening for the introduction of the oil supply into said oil cup and for the feeding of the oil laterally therethrough into said passage, the walls of said oil cup being otherwise imperforate.

3. In an oiling device, the combination of means forming a passage for conducting the oil toward the bearing surface to be supplied, and an oil cup having a stem separable laterally from said means, said stem being provided with a lateral opening for the introduction of oil into said oil cup and for the feeding of oil laterally therefrom into said passage, said oil cup being otherwise imperforate.

In testimony whereof, I have signed my name to this specification.

JOHN R. TILLMAN.

Copies of this patent may be obtained for five cents each, by addressing the "Commissioner of Patents, Washington, D. C."